March 19, 1968 — S. GROSSWALD — 3,373,781
GUIDE FOR PORTABLE SAWS
Filed May 13, 1966
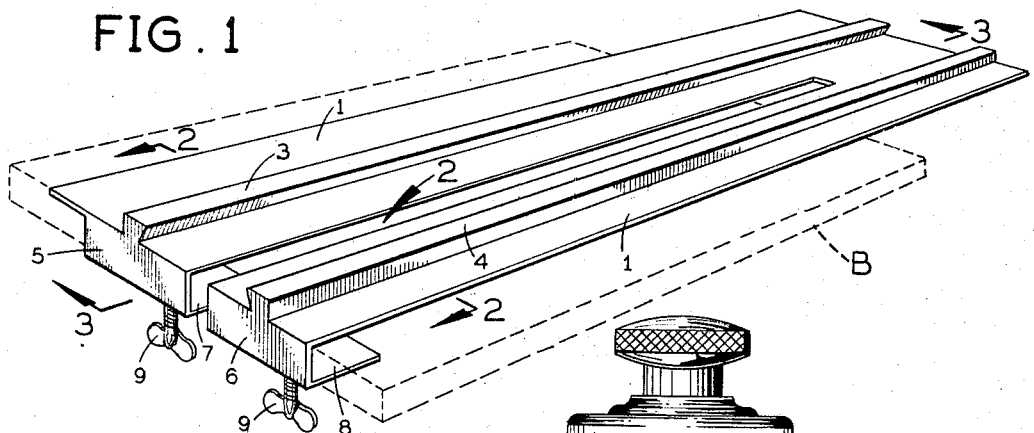
FIG. 1
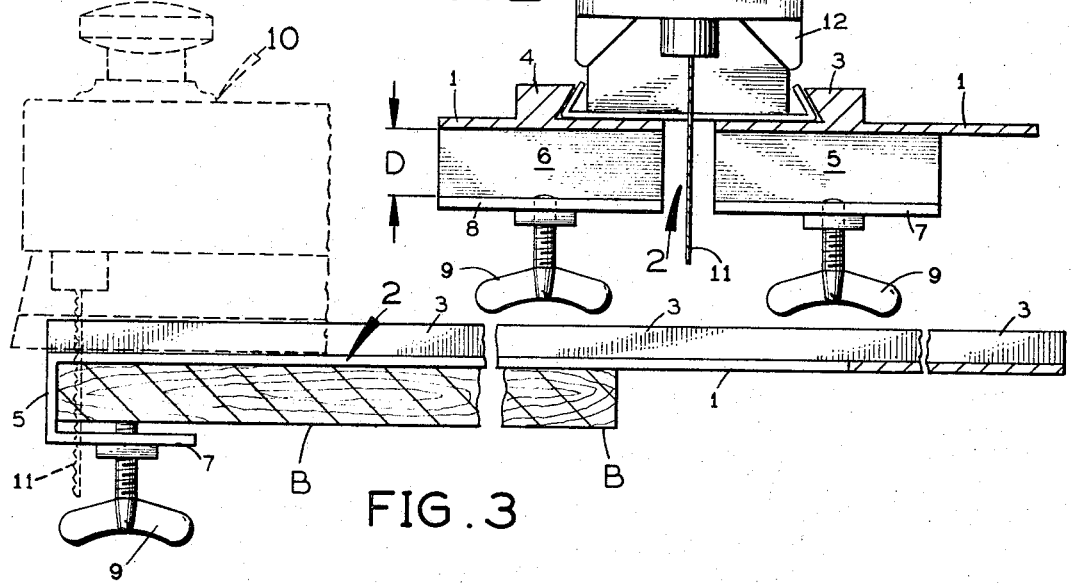
FIG. 2
FIG. 3
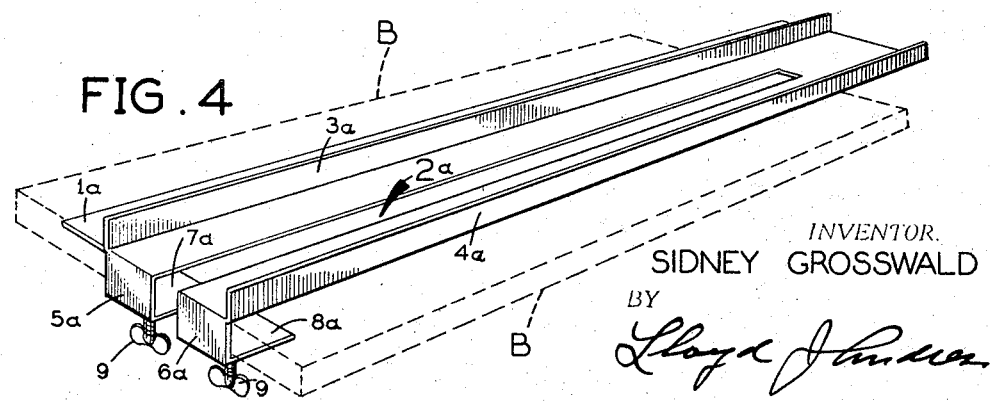
FIG. 4
INVENTOR.
SIDNEY GROSSWALD
BY
Lloyd Andersen

United States Patent Office 3,373,781
Patented Mar. 19, 1968

3,373,781
GUIDE FOR PORTABLE SAWS
Sidney Grosswald, Miami, Fla.
(1740 S. Glades Drive, North Miami Beach, Fla. 33162)
Filed May 13, 1966, Ser. No. 549,850
3 Claims. (Cl. 143—167)

This invention relates in general to woodworking tools and more particularly to a portable guide for power driven sabre saws for making straight cuts into or through wood or composition boards.

Prior portable saw guides were limited for use with hand saws and usually included adjustable quadrant means for guiding a saw for angle cuts, which construction is necessarily complicated, resulting in high manufacturing cost. Furthermore, the prior saw guides when used with power saws are relatively dangerous to the user and the guide because of the lack of positive engagement between the power saw and the guide.

The present invention overcomes the above objections and disadvantages by the provision of a low cost one piece rigid guide which includes rails or gibs for positively guiding a power saw for a straight cut in or through a board when clamped to the latter, which construction is a principal object of the invention.

A further object of the invention is the provision of a rigid saw guide means including integral manually operated clamps for securing the guide to a board including gib means parallel with and straddling a central slot for slidably guiding a power saw in a straight path and moving the saw blade through said slot for a transverse cut into or through a board.

These and other objects and advantages in two embodiments of the invention are shown and described in the following specification and drawing, in which:

FIG. 1 is a perspective view of the saw guide in reduced scale.

FIG. 2 is an enlarged cross sectional elevation taken through section line 2—2, FIG. 1.

FIG. 3 is an enlarged cross sectional view taken through section line 3—3, FIG. 1.

FIG. 4 is a perspective view of an alternate form of saw guide shown in FIG. 1.

Referring to FIG. 1, the guide comprises an integral assembly of a metal main plate 1 having a planar bottom and with a longitudinal slot 2 positioned centrally therein and a pair of left and right rails or gibs 3 and 4 parallel with and straddling the slot and having upward converging planar inner surfaces, forming a dovetail way.

The plate is provided with integral generally C-shaped clamping portions at one end thereof consisting of vertical portions 5 and 6 and lower portions 7 and 8, parallel the bottom side of the plate, as shown. The inner surfaces of the vertical portions 5 and 6 in this embodiment are positioned coplanar and at right angles to the gibs 3 and 4. The lower inward extending portions 7 and 8 are parallel plate 1 and have wing screws 9—9 threaded therein, better shown in FIG. 2.

Referring to FIG. 2, a typical power sabre saw assembly 10, having a driven blade 11, is fitted with a shoe means 12 shaped and dimensioned to be slidably retained in the dovetail surfaces of gibs 3 and 4 for reciprocal movement along main plate 1 with the blade of the saw centrally positioned through the slot 2.

FIG. 3 illustrates a board of wood B clamped against the bottom side of main plate 1 by screws 9 with the forward edge of the board positioned against vertical clamp portions 5 and 6. The sabre saw is positioned at the rear open part of slot 2 and then the board may be sawed a predetermined distance with a straight cut at right angles to its forward edge or may be cut through, depending upon the distance the saw is manually moved in a forward direction.

It is apparent that cylindrical or other shaped gibs may be used to retain a mating saw shoe, but the dovetail shape is low in manufacturing cost as well as highly effective.

FIG. 4 shows an alternate form of saw guide in which vertical rails or gibs 3a and 4a are substituted for the dovetail gibs, whereby a standard electric sabre saw or circular saw may be manually guided in a non-captive manner between the vertical gibs 3a and 4a when held downward against either one thus enabling a straight angle right angled cut to be made in a board with respect to the forward edge thereof.

In practice, the opening in the clamping portion is sufficiently wide to permit a shim to be placed between the board and each screw 9, or each screw may be fitted with a well known limited movement universal head to prevent marring of the board.

It is to be noted that the same effective construction will apply to a guide with any predetermined different fixed angle between the plane of portions 5 and 6 and the slot 2 and gibs 3 and 4.

It is also to be noted that when unusually wide boards are to be straight cut a conventional "C" clamp may be secured around the board and a rear portion of plate 1 for added security.

It is understood that certain modifications in the above construction, utilizing the features described, are intended to come within the scope of the appended claims.

Having described my invention, I claim:

1. A guide for a power saw means for making a straight cut through a board comprising a main base plate having a planar bottom surface,
   a pair of parallel spaced gibs on said plate along the length thereof integral therewith positioned in parallel spaced relation with said bottom surface,
   said plate having an open slot from one side thereof parallel and between said gibs a predetermined distance through said plate from the said one side,
   an integral clamp means on each side of said slot positioned at the said one end of said plate extending downward a predetermined distance from said bottom surface having coplanar inner register surfaces at a right angle to said bottom surface and said slot,
   each of said clamp means having an integral inward extending portion in spaced relation from said bottom surface including a threaded hole therein normal thereto,
   a thumb screw threaded into each of said holes for independently engaging the under side of said board for holding same when one edge thereof is positioned against said register surfaces and the upper side of said board is positioned against said bottom surface,
   a power saw means including a guide shoe slidably engaged with said gibs for reciprocating movement along said gibs with the driven blade of said saw means extending downward through said slot whereby a board clamped against said bottom surface will be straight sawed when said saw means is operated and reciprocated along said gibs.

2. A guide for a power saw means for making a straight cut through a board comprising a main base plate having a planar bottom surface,
   at least one rail of uniform cross section integral with and extending above the upper side of said plate parallel said bottom surface,
   said plate having an open slot from one side thereof adjacent and parallel said rail a predetermined distance through said plate from said one side, an integral clamp means on each side of said slot at the said one end of said plate adapted and constructed to engage and clamp the said board with the upper side thereof against the said bottom surface, a power saw means having a shoe adapted to slidably engage said rail for reciprocating movement along the said rail with the driven blade of said saw means extending downward through said slot whereby a board clamped against said bottom surface will be straight sawed when said saw means is operated and reciprocated along said rail.

3. The construction recited in claim 2 including coplanar surfaces on the inner side of said clamp means with the plane of said surfaces at right angles to said rail for registering one edge of said board for a right angle saw cut therein with respect to said edge.

References Cited
UNITED STATES PATENTS

| | | | |
|---|---|---|---|
| 1,457,492 | 6/1923 | Bloodgood | 143—6 |
| 2,630,147 | 3/1953 | Garberg | 143—6 XR |
| 2,677,399 | 5/1954 | Getsinger | 143—6 |
| 2,708,465 | 5/1955 | Huebner et al. | 143—6 XR |
| 3,186,452 | 6/1965 | Magnussen | 143—47 |

WILLIAM W. DYER, JR., *Primary Examiner.*

W. D. BRAY, *Assistant Examiner.*